United States Patent Office 3,386,811
Patented June 4, 1968

3,386,811
PREPARATION OF AN ACTINIDE METAL MONO-CARBIDE FROM AN OXIDE THEREOF
Lloyd A. Hanson, Canoga Park, Calif., assignor to North American Rockwell Corporation, a corporation of Delaware
No Drawing. Filed June 3, 1966, Ser. No. 554,958
7 Claims. (Cl. 23—344)

ABSTRACT OF THE DISCLOSURE

A method for converting an actinide metal oxide to the monocarbide by carbothermic reduction, which may be performed at a lower temperature than heretofore and which removes trace impurities of fluorine and oxygen. The actinide metal oxide, typically $UO_2$, is heated together with carbon and a small amount of silicon under vacuum at a temperature of about 1700–1800° C. to convert the $UO_2$ to UC.

---

The present invention relates to a method for the production of an actinide metal monocarbide from an oxide thereof, and more particularly to a method for the preparation of uranium monocarbide from a uranium oxide with controlled carbon concentration and reduced amounts of the trace impurities oxygen and fluorine.

Actinide metal monocarbides (i.e., those of uranium, plutonium, and thorium) are gaining increased attention as nuclear reactor fuels, particularly for organic (hydrocarbon) cooled reactors such as heavy water-moderated, organic-cooled reactors, and for sodium-cooled fast breeder reactors. A review of the properties of uranium monocarbide will indicate the reasons for the current efforts to develop an economical and reliable fuel fabrication process. Uranium monocarbide is capable of reaching higher burnups than uranium metal or uranium metal alloys, without the distortion caused in the metal fuels by gaseous fission products such as xenon and krypton. While other ceramic compounds such as $UO_2$ are capable of high fuel burnup, the thermal conductivity of uranium monocarbide is greater than of the ceramic compositions and approaches that of uranium metal. This is of considerable benefit in fuel element and reactor core design, and in setting maximum fuel element operating temperatures and power levels. The combination of high burnup, dimensional stability and good thermal conductivity make uranium monocarbide an ideal fuel for high-temperature, high-performance nuclear reactors.

It is important that the cost of each step in a monocarbide fuel cycle be reduced to a minimum, since in calculating the costs of power production, the overall economics of the fuel cycle must be considered. Starting materials currently in use for the preparation of enriched uranium carbide are uranium metal and uranium dioxide, which are derived either from uranium hexafluoride in the gaseous diffusion process for the enrichment of uranium with respect to U–235, or from uranyl nitrate in the aqueous reprocessing of spent, irradiated uranium fuels. There is interest in utilizing less expensive uranium compounds as the starting material for UC production, including $UO_3$ and ammonium diuranate, $(NH_4)_2U_2O_7$ or ADU. ADU is obtained by reacting uranyl nitrate or $UF_6$ with ammonia by known methods, and $UO_3$ (or $U_3O_8$) is similarly an intermediate in the conversion of $UF_6$ or uranyl nitrate to $UO_2$ or uranium metal. As used in the present application, the term "uranium oxide" is intended to include $UO_3$, $U_3O_8$, and $UO_2$ and mixtures thereof.

The reaction of $UO_2$, $U_3O_8$, or uranium metal with carbon to form UC is known to the art. After such UC powders are formed, uranium carbide fuel slugs are prepared by arc melting and casting the material. It is necessary for a number of reasons that the uranium carbide powders for arc melting be of high quality, uniform carbon content, and low impurity level. Residual oxygen present in high amounts, say over 600 parts per million, tends to attack the electrodes used in the arc melting process, shortening their life, and decreasing the yield and purity of arc-cast uranium carbide product. Moreover, the oxygen may occupy lattice positions otherwise taken by carbon, leading to a non-homogeneous carbon content in the uranium carbide.

Uniform carbon content, where the monocarbide is either exactly stoichiometric (4.8 weight percent carbon) or slightly hypostoichiometric is preferred. This is because free carbon in a hyperstoichiometric UC matrix tends to migrate to and carburize the stainless steel jackets of UC fuel slugs, thereby structurally weakening the stainless steel and leading to failure of the fuel elements. It is further required that the impurity content in the UC be held to a minimum level, in order to avoid the presence of high neutron cross section materials, which detract from the neutron economy of the reactor core, and of other metallurgically undesirable elements. This in particular applies to trace fluorine, which may be left from reducing the $UF_6$ gaseous diffusion product. Trace fluorine also tends to decrease the ultimate UC yield because of the loss of volatile uranium fluorides.

An object of the present invention, accordingly, is to provide a method for the production of an actinide metal monocarbide from an oxide thereof.

Another object is to provide a method for the production of uranium monocarbide from a uranium oxide of controlled carbon concentration and low impurity content.

Another object is to provide, in a method for the conversion of uranium oxide to uranium monocarbide by carbothermic reduction, an improved method for the reduction of trace oxygen and fluorine impurities.

Another object is to provide such a method which is relatively simple, economical, and reliable.

Still another object is to provide a method for the production of uranium monocarbide of homogeneous carbon content wherein the resulting uranium monocarbide powders may be arc melted and cast with a high acceptable product yield.

Still another object is to provide a method for the conversion of uranium oxides to uranium monocarbide wherein any higher valence uranium oxides are first reduced to uranium dioxide and then the resulting uranium dioxide is carbothermically converted to uranium monocarbide at a higher temperature.

Other objects and advantages of the present invention will become apparent from the following detailed description and the appended claims.

The present invention comprises, in a process for the conversion of an actinide metal oxide to the monocarbide with carbon at an elevated temperature in an inert environment, the improvement of providing a small amount of silicon with said oxide and carbon reactants. It is found that the addition of a small amount of a material selected from silicon and silicon dioxide improves the homogeneity of the resulting uranium monocarbide and decreases the impurity content, in particular oxygen and fluorine impurities.

The uranium yield in the final uranium carbide product is also improved. It is believed that the silicon forms silicon fluorides or ammonium fluorosilicates with the trace fluorine and thus prevents formation and loss of volatile uranium fluorides at the elevated temperatures employed for uranium carbide formation. Further, as noted above, at the temperatures which uranium carbide is prepared by carbothermic reduction of uranium oxide, oxygen ordinarily replaces missing carbon in the UC lattice. It is believed that silicon remaining after fluorine removal functions as a fluxing agent which removes oxygen from the lattice and thus aids in obtaining very low oxygen contents (less than 330 p.p.m.) in UC. A low residual oxygen content not only improves the stoichiometry and uniformity of the UC, but is of advantage in producing carbide melt stock for arc melting and casting into fuel slugs. It is further found that with the silicon addition, UC can be completely transformed at a temperature several hundred degrees lower than formerly, at about 1700–1800° C. as compared with about 2000–2100° C.

As a general matter, only a relatively small amount of silicon (usually in the form of silica in view of its availability and cheapness) need be employed, in order to be effective for the stated purposes. The exact amount may satisfactorily vary with the particular oxide form employed, and its impurity content as a factor of prior history from the gaseous diffusion cascade, chemical reprocessing of spent fuel, or methods employed in converting such uranium values to uranium oxide. The effective amount of silicon which is ordinarily employed in the carbothermic reduction of uranium oxide to UC is about 0.5–2.0 weight percent (as $SiO_2$, and correspondingly less as Si). It is found, for example, that about 1.7 weight percent $SiO_2$ is optimum in the preparation of uranium carbide from ADU and about 1.0 weight percent $SiO_2$ is optimum for the preparation of uranium carbide from $UO_3$.

Uranium monocarbide is formed by reacting $UO_2$ with carbon at temperatures beginning at about 1300° C. (the higher temperatures previously mentioned being necessary for complete transformation) under an inert environment (reducing, inert gas, or preferably vacuum). Uranium oxides other than $UO_2$ are first converted to $UO_2$ at temperatures up to about 850° C. in an inert environment, after which the temperature is raised for the UC formation. The conversion of uranium oxides to UC can be conducted in a two-step process, with a first heating at a lower temperature to form $UO_2$ followed by the formation of UC at the higher temperature. Near-stoichiometric $UC_{1.0}$ or hypostoichiometric UC (with carbon contents in the range of 4.3–4.8 weight percent), with oxygen contents below about 300 p.p.m., is obtained by suitably adjusting the carbon concentration in the reaction mixture with $UO_2$ and using a small amount of silicon, the residual silicon providing the fluxing action, and heating a few hours at about 1750° C.

The following will describe the conversion of various uranium oxides to uranium monocarbide through the intermediate formation of $UO_2$.

Conversion of ADU to uranium carbide

Ammonium diuranate is a complex compound which can vary in composition, especially in U content and $NH_4$/U ratio. The ammonium is removed from the composition by heating to below about 400° C. and the resulting oxide (probably $UO_3$) is converted to $UO_2$ below about 850° C. The removal of ammonium does not consume any carbon, which is consumed at higher temperatures as the oxide is being reduced to $UO_2$. The carbon consumed in converting ADU to $UO_2$ is about 0.5 mole C per mole U. A possible mechanism to explain this reaction is:

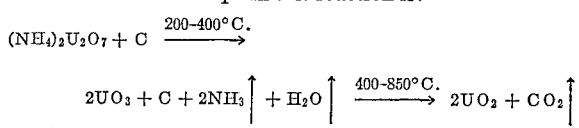

The mole ratio of carbon to uranium to produce $UC_{1.0}$ from ADU is 3.51 using 1.7 weight percent $SiO_2$, and 3.40 using 0.8 weight percent Si. A possible equation for the overall conversion of ADU to UC in a two-step heating process, first at a temperature up to 850° C. to convert ADU to $UO_2$ and then at higher temperatures up to 1750° C. to produce UC from $UO_2$, is:

$$(NH_4)_2U_2O_7 + 7C \rightarrow 2UC + NH_3\uparrow + H_2O\uparrow + CO_2\uparrow + 4CO\uparrow$$

The conversion reactions are conducted in the following manner, which will serve as specific examples of the practice of the present invention. The reactants were weighed, dry-blended several hours, and compacted into ½-inch diameter pellets to facilitate handling. The pellets were heated under vacuum in a quartz reaction chamber for about one hour at 850° C., held for an additional hour and cooled. This step converted the ADU to $UO_2$. Conversion to UC was then carried out by heating under vacuum, first rapidly to 1300° C., and then gradually to a temperature of 1750° C., which temperature was maintained until the action was complete as evidenced by a final system pressure of less than 0.2 micron. The product was then cooled in vacuum, re-weighed and placed in a glove box (argon atmosphere) for analytical sampling. Samples were analyzed by standard methods: combustion for carbon; inert gas fusion for oxygen; either colorimetric or spectrographic for silicon; colorimetric for ammonium and fluorine; volumetric for uranium; and polarographic for O:U ratio. The oxygen and carbon values listed in the tables below are an average of two or three individual determinations.

The uranium carbide pellets were silvery gray in color, greatly reduced in volume over that of the original pellets, had a geometric density of 7 to 10 grams per cm.³, and an immersion density (in $CCl_4$ at room temperature) of 11 to 12 grams/cm.³. The weight loss data indicated negligible uranium loss in the process, and residual fluorine was less than 20 p.p.m. Fluorine is believed to have been removed as either $SiF_4$ or as ammonium silicofluoride. A significant feature was the low residual oxygen contents in the UC.

The detailed reaction conditions and results of preparing uranium carbide from ADU in the foregoing manner are given in the following Table I.

TABLE I.—PREPARATION OF URANIUM MONOCARBIDE FROM AMMONIUM DIURANATE

| Run No. | Input [1] (wt. percent) | | | Reaction | | | Weight Loss (wt. percent) | | Product Composition | | | | |
|---|---|---|---|---|---|---|---|---|---|---|---|---|---|
| | Carbon | Si | $SiO_2$ | Total Time (hr.) | Max. Temp. (° C.) | Time at Temp. (hr.) | Exp. | Theo.[2] | Carbon (weight percent) | Oxygen (p.p.m.) | Silicon (p.p.m.) | Fluorine (p.p.m.) | Compounds by X-ray |
| 1 | 11.33 | 0.8 | 0 | 8 | 1,750 | 2 | 32.0 | 32.2 | 5.04 | 755 | 180 | | [3] |
| 2 | 11.10 | 0.8 | 0 | 8 | 1,750 | 2 | 32.1 | 32.0 | 4.75 | 180 | 285 | 20 | UC only. |
| 3 | 10.87 | 0.8 | 0 | 8 | 1,750 | 2 | 31.9 | 31.8 | 4.56 | 310 | 95 | 20 | [3] |
| 4 | 11.56 | 0 | 1.7 | 6½ | 1,750 | 2 | 32.8 | 32.9 | 5.12 | 230 | | | [3] |
| 5 | 11.43 | 0 | 1.7 | 6½ | 1,750 | 2 | 33.0 | 32.9 | 4.89 | 460 | | | [3] |
| 6 | 11.33 | 0 | 1.7 | 6½ | 1,750 | 2 | 33.0 | 32.9 | 4.80 | 280 | | | [3] |
| 7 | 11.27 | 0 | 1.7 | 6 | 1,750 | 2 | 32.8 | 32.8 | 4.70 | 300 | 10 | | [3] |
| 8 | 11.23 | 0 | 1.7 | 4 | 1,650 | 1 | 32.9 | 32.8 | 4.67 | 640 | 100 | | [3] |
| 9 | 11.23 | 0 | 1.7 | 6½ | 1,750 | 2 | 33.0 | 32.8 | 4.61 | 185 | 75 | 20 | UC only. |
| 10 | 11.00 | 0 | 1.7 | 6½ | 1,750 | 2 | 32.9 | 32.7 | 4.44 | 175 | 135 | 20 | [3] |
| 11 | 10.96 | 0 | 1.7 | 4 | 1,650 | 1 | 32.5 | 32.7 | 4.47 | 770 | | | [3] |
| 12 | 10.76 | 0 | 1.7 | 6½ | 1,750 | 2 | 32.8 | 32.6 | 4.27 | 225 | 70 | | [3] |

[1] Remainder is ADU. Si and $SiO_2$ input was based on removal of fluorine as $SiF_4$.
[2] Assuming a pure $UC_{1.0}$ product and no uranium loss.
[3] No analysis.

The effects of using different amounts of silicon in the ADU conversion are given in the following table. The results indicate a considerable loss of uranium in the first two runs, where no or a small amount of silicon was used, substantial oxygen reduction in Runs 3 and 4, and residual silicon in product of Runs 5 and 6 where excess silicon was used. From the standpoint of carbon control, low residual oxygen and silicon content and high density, a silicon metal input of about 1 weight percent appears to yield the best carbide product.

nuclear reactors. Therefore, the term "actinide metal oxide" is intended to include not only uranium oxide but also plutonium oxide and thorium oxide and mixtures thereof.

It is apparent that changes may be made, as required by specific applications, in reaction conditions and procedures by those skilled in nuclear fuel chemistry, which are still within the scope of the present invention. Therefore, the present invention should be understood to be limited only as is indicated in the appended claims.

TABLE II.—CONVERSION OF AMMONIUM DIURANATE TO URANIUM MONOCARBIDE WITH DIFFERENT AMOUNTS OF SILICON

| Run No.[1] | Silicon Input[2] (weight percent) | Weight Loss, (wt. percent) | | Pellet Density, gm./cm.$^3$ | | Product Composition | | |
|---|---|---|---|---|---|---|---|---|
| | | Exp. | Theo.[3] | Geometric | Immersion | Carbon (weight percent) | Oxygen, p.p.m. | Silicon, p.p.m. |
| 1 | 0 | 37.1 | 31.4 | 4.9 | 12.8 | 5.55 | 1,070 | 0 |
| 2 | 0.4 | 34.2 | 31.4 | 5.3 | 12.4 | 5.14 | 1,290 | 10 |
| 3 | 0.8 | 31.9 | 31.8 | 7.0 | 11.8 | 4.79 | 420 | 10 |
| 4 | 1.0 | 31.6 | 31.8 | 10.3 | 11.7 | 4.82 | 90 | 15 |
| 5 | 2.0 | 31.5 | 32.5 | 10.0 | 11.5 | 4.84 | 180 | 5,900 |
| 6 | 4.0 | 32.0 | 34.0 | 8.3 | 10.4 | 5.04 | 535 | 8,800 |

[1] Reaction Conditions: 6-7 hours total heating time with 2 hours at the maximum temperature of 1,750° C.
[2] A ratio of 0.1253 gm. C/gm. ADU was used in each run. An input of 0.8 wt. percent is the calculated amount of silicon to removal of all fluorine in this ADU as $SiF_4$.
[3] Assuming a $UC_{1.0}$ product, no uranium loss, and vaporization of all silicon.

Conversion of $UO_3$ to UC

Two heating steps were employed for the conversion of $UO_3$ to UC, conversion to $UO_2$ at 850° C. and formation of UC above 1300° C. The overall reaction is:

$$UO_3 + 3.5C \rightarrow UC + 0.5CO_2 + 2CO$$

The uranium carbide pellets obtained from the runs recorded in Table III, wherein the procedures described above with resepct to the conversion of ADU to UC were employed, were silvery gray in color, had geometric densities of 7-8 grams/cm.$^3$, and immersion densities of 11.0-11.5 gms./cm.$^3$. The weight loss data indicating a slight uranium loss (averaging about 0.2 weight percent) may have been in slight error. Silica, which was used as an additive in Runs 6-10, demonstrated its effectiveness in obtaining a UC product with a low residual oxygen content, whereas in Runs 1-5, where silicon was not used, the oxygen content was much higher.

The claims are:

1. In a method for the conversion of an actinide metal compound selected from oxides and diuranate to the monocarbide, which comprises providing said compound in the dioxide form and heating said oxide with carbon at a temperature up to about 1800° C. in an inert environment, the improvement which comprises providing about 0.5–2.0 weight percent of a material selected from silicon and silicon dioxide with said dioxide and carbon reactants.

2. The method of claim 1 wherein said actinide metal compound is ammonium diuranate.

3. The method of claim 1 wherein said actinide metal compound is $UO_3$.

4. In a method for the conversion of a uranium compound selected from $UO_3$, $U_3O_8$ and $(NA_4)_2U_2O_7$ to UC by reacting said with carbon, first at a relatively low temperature under vacuum to produce $UO_2$, and then at a relatively higher temperature up to about 1800° C. under vacuum to convert the resulting $UO_2$ to UC, the improvement which comprises adding about 0.5–2.0 weight percent of a material selected from silicon and silicon dioxide with said uranium compound and carbon reactants.

5. The method of claim 4 wherein about one weight percent $SiO_2$ is employed.

6. The method of claim 4 wherein the first reaction is conducted at a temperature up to about 850° C. and the second reaction is conducted at a temperature up to about 1750° C.

TABLE III.—PREPARATION OF URANIUM MONOCARBIDE FROM $UO_3$ BY CARBOTHERMIC REDUCTION IN VACUUM

| Run No. | Input | | | Reaction | | | Weight Loss, (wt. percent) | | Uranium Carbide Product | | |
|---|---|---|---|---|---|---|---|---|---|---|---|
| | Carbon | | $SiO_2$ | | | | | | | | |
| | Mole ratio C/$UO_3$ | Weight percent | Weight percent | Total Time (hr.) | Max. Temp. (° C.) | Time at Temp. (hr.) | Exp. | Theo.[1] | Carbon (weight percent) | Oxygen (p.p.m.) | Silicon (wt. percent) |
| 1 | 3.45 | 12.65 | 0 | 9 | 1,750 | 3 | 25.2 | 24.9 | 4.57 | 660 | ([2]) |
| 2 | 3.48 | 12.75 | 0 | 8½ | 1,750 | 2¼ | 25.1 | 24.9 | 4.71 | 750 | ([2]) |
| 3 | 3.50 | 12.81 | 0 | 9 | 1,750 | 3 | 25.2 | 24.9 | 4.73 | 760 | ([2]) |
| 4 | 3.54 | 12.94 | 0 | 9 | 1,750 | 3 | 25.2 | 24.9 | 4.80 | 435 | ([2]) |
| 5 | 3.58 | 13.07 | 0 | 8½ | 1,750 | 2¼ | 24.8 | 24.9 | 5.05 | 625 | ([2]) |
| 6 | | 12.58 | 1.0 | 8½ | 1,750 | 2¼ | 26.0 | 25.8 | 4.45 | 150 | 0.10 |
| 7 | | 12.76 | 1.0 | 8½ | 1,750 | 2¼ | 26.2 | 25.8 | 4.67 | 405 | 0.01 |
| 8 | | 12.95 | 1.0 | 8 | 1,750 | 2½ | 26.0 | 25.8 | 4.87 | 165 | 0.10 |
| 9 | | 13.12 | 1.0 | 8 | 1,750 | 2½ | 26.0 | 25.8 | 5.02 | 220 | 0.10 |
| 10 | | 13.29 | 1.0 | 8 | 1,750 | 2½ | 26.0 | 25.8 | 5.22 | 275 | 0.10 |

[1] Calculation based on uranium content of the $UO_3$ (82.0 wt. percent), no loss of uranium and a pure uranium carbide product.
[2] No analysis.

As mentioned earlier, oxides of other nuclear fuel metals in the chemically very similar actinide rare earth series of the elements (Elements 90-103), such as the oxides of plutonium or thorium corresponding to those of uranium, may similarly be converted to the corresponding carbide. For example, plutonium hydroxide (normally precipitated from plutonium nitrate by ammonia) and mixtures of plutonium hydroxide and ADU may be readily converted to carbide. Plutonium carbide may be used as the fuel in a fast nuclear reactor, and mixtures of plutonium and uranium carbides or of uranium and thorium carbides find application in breeder or converter-type 7. A method for the conversion to uranium monocarbide of a uranium compound selected from the group consisting of ammonium diuranate, $UO_3$, and $U_3O_8$ to uranium monocarbide, which comprises mixing powders of said compound, carbon, and about one weight percent $SiO_2$, heating the resulting mixture under vacuum at a temperature of about 850° C. until $UO_2$ is obtained, and then further continuing the heating under vacuum at a temperature of about 1750° C. until said $UO_2$ is converted to UC.

References Cited
UNITED STATES PATENTS

| | | | |
|---|---|---|---|
| 3,046,090 | 7/1962 | Powers | 23—349 |
| 3,250,588 | 5/1966 | Kasberg | 23—349 |

CARL D. QUARFORTH, *Primary Examiner.*

BENJAMIN R. PADGETT, *Examiner.*

S. TRAUB, R. L. GRUDZIECKI, *Assistant Examiners.*